(12) United States Patent
Yao

(10) Patent No.: US 9,575,996 B2
(45) Date of Patent: Feb. 21, 2017

(54) EMOTION IMAGE RECOMMENDATION SYSTEM AND METHOD THEREOF

(71) Applicants: Inventec (Pudong) Technology Corporation, Shanghai (CN); Inventec Corporation, Taipei (TW)

(72) Inventor: Ti Ku Yao, Taipei (TW)

(73) Assignees: INVENTEC (PUDONG) TECHNOLOGY CORPORATION (CN); INVENTEC CORPORATION (TW)

(\*) Notice: Subject to any disclaimer, the term of this patent is extended or adjusted under 35 U.S.C. 154(b) by 21 days.

(21) Appl. No.: 14/674,951

(22) Filed: Mar. 31, 2015

(65) Prior Publication Data

US 2016/0154825 A1 Jun. 2, 2016

(30) Foreign Application Priority Data

Nov. 27, 2014 (CN) .......................... 2014 1 0697209

(51) Int. Cl.
*G06K 9/62* (2006.01)
*G06F 17/30* (2006.01)

(52) U.S. Cl.
CPC ..... *G06F 17/30268* (2013.01); *G06F 17/3028* (2013.01); *G06K 9/6201* (2013.01); *G06K 9/6268* (2013.01)

(58) Field of Classification Search
None
See application file for complete search history.

(56) References Cited

U.S. PATENT DOCUMENTS

| 2009/0125806 A1* | 5/2009 | Chiu | ...................... G06F 17/277 715/256 |
| 2013/0159919 A1* | 6/2013 | Leydon | ................. G06F 3/0236 715/780 |

\* cited by examiner

*Primary Examiner* — Brian P Werner
(74) *Attorney, Agent, or Firm* — David R. Stevens; Stevens Law Group

(57) ABSTRACT

A emotion image recommendation system and method are disclosed, where a recommended emotion image is provided in replace with a selected emotion image as conventionally used by a user, thereby an emotion image corresponding to an emotional word used by the user may be provided, so that the efficacy of a reduced frequency for locating the appropriate emotion image for the user may be achieved.

8 Claims, 9 Drawing Sheets

EMOTION IMAGE RECOMMENDATION SYSTEM AND METHOD THEREOF

CROSS-REFERENCE TO RELATED APPLICATION

This application claims the benefit of Chinese Patent Application No. 201410697209.8, filed Nov. 27, 2014.

BACKGROUND OF THE RELATED ART

Technical Field

The present invention relates to an image recommendation system and method thereof, and particularly to an emotion image recommendation system and method used in online communications.

Prior Art

Users may chat on online communications software, and their online state may be quickly known. Through the online communications software, online messages, sound or video interaction may be achieved.

On the interaction through the online communications, introducing an emotion image into the online communications may provide a further visualized experience. However, the currently available online communications software may achieve the insertion of the emotion image only by entering an emotion image function and then searching through multiple classifications and pages. Too many emotion images may take too much frequency for the user in searching an appropriate emotion image, which might even be longer than that for a word input. This may adversely affect the user's will to use the emotion image.

Furthermore, since the user has to search the appropriate emotion image on the present online communications software only by going through the multiple classifications and pages after the emotion image function is selected, resulting unavoidably in a mis-selection of the emotion image by the user. This might cause some unnecessary mistakes on the user's chat partner, and thus the user might have the possibility of the decreased willing in using such online communications software.

In view of the above, it may be known that there has long been the problems that locating an appropriate image consumes too much waste frequency and an emotion image may be mis-selected, there is quite a need to set forth an improvement means to settle down these problems.

SUMMARY

In view of the problems encountered in the prior art that locating an appropriate image consumes too much waste frequency and an emotion image may be mis-selected, the present invention provides an emotion image recommendation system and method.

According to a first aspect of the present invention, the emotion image recommendation system comprises a user database for storing a plurality of recorded data each corresponding to one of user operations; an image and word database for storing a plurality of image classifications and a plurality of word classifications, each image classifications stored a plurality of image data, each word classifications stored a plurality of word data, and the image classifications corresponding to one of the plurality of word classifications; a receiving unit for receiving an input data inputted by a user; a processing unit for comparing the input data and the plurality of word classifications to find out the input data having an emotional word, and the word classifications and the image classifications that corresponding to the emotional word, to get all of the image data within the image classifications, and calculating a correlate value between the emotional word and each of the plurality of image data, according to the emotional word, the image data and recorded data corresponding to user operations; and an emotion image recommendation unit for sorting each of the plurality of image data according to the correlate value, and displaying a sorted result of the plurality of image data sequentially, to provide an emotion image recommendation.

According to a second aspect of the present invention, the emotion image recommendation system comprises a user database for storing a plurality of recorded data each corresponding to one of user operations; an image and word database for storing a plurality of image classifications and a plurality of word classifications, each image classifications stored a plurality of image data, each word classifications stored a plurality of word data, and the image classifications corresponding to one of the plurality of word classifications; a receiving unit for receiving an input data inputted by a user; a processing unit for comparing the input data and the plurality of word classifications to find out the input data having an emotional word and one of the plurality of image classifications and the word classifications and the image classifications that corresponding to the emotional word, to get all of the image data within the image classifications, and calculating a correlate value between the emotional word and each of the plurality of image data, according to the emotional word, image data and the recorded data corresponding to user operations; and an emotion image recommendation unit for displaying one of image data which is a maximum of the correlate value to provide an emotion image recommendation.

According to the present invention, the emotion image recommendation method, comprising steps of pre-establishing a user database for storing a plurality of recorded data each corresponding to one of user operations; pre-establishing an image and word database for storing a plurality of image classifications and a plurality of word classifications, each image classifications stored a plurality of image data, each word classifications stored a plurality of word data, and the image classifications corresponding to one of the plurality of word classifications; receiving an input data inputted by a user by a receiving unit; comparing the input data and the plurality of word classifications by a processing unit to find out the input data having an emotional word, and the word classifications and the image classifications that corresponding to the emotional word, to get all of the image data within the image classifications; calculating a correlate value between the emotional word and each of the plurality of image data by the processing unit, according to the emotional word, the image data and recorded data corresponding to user operations; sorting each of the plurality of image data according to the correlate value by the emotion image recommendation unit; and displaying a sorted result of the plurality of image data sequentially by the emotion image recommendation unit to provide an emotion image recommendation.

The system and method of the present invention has the difference as compared to the prior art that the way of recommending the emotion image is used in replace of searching the appropriate emotion image by the user himself/herself may largely save the frequency for searching the appropriate emotion image by the user and further assist in the selection of the appropriate emotion image, thereby providing the accustomed emotion image when the user inputs the emotional word.

By using the above technical means, the present invention may achieve in the efficacies that the user may be provided with the emotion image corresponding to the emotional word to largely save the frequency for searching for the appropriate emotion image, and further assisted in the selection of the appropriate emotion image.

BRIEF DESCRIPTION OF THE DRAWINGS

The present invention will be better understood from the following detailed descriptions of the preferred embodiments according to the present invention, taken in conjunction with the accompanying drawings, in which.

DETAILED DESCRIPTION

The present invention will be apparent from the following detailed description, which proceeds with reference to the accompanying drawings, wherein the same references relate to the same elements.

Figure 1:
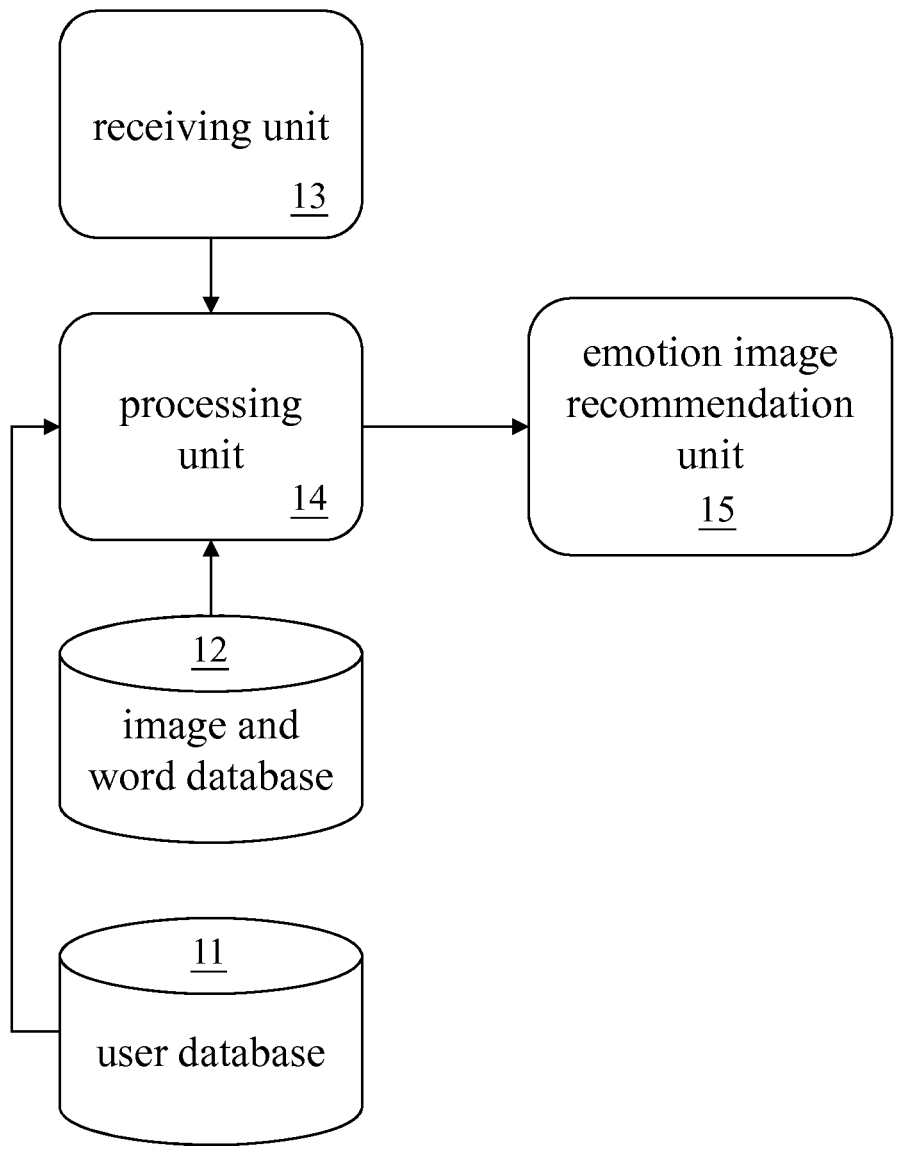
FIG. 1 is a system block diagram of an emotion image recommendation system according to the present invention.

In the following, an emotion image recommendation system according to a first embodiment of the present invention will be described first, with simultaneous reference to FIG. 1, in which FIG. 1 is a system block diagram of an emotion image recommendation system according to the present invention.

As shown, the emotion image recommendation system comprises a user database 11, an image and word database 12, a receiving unit 13, a processing unit 14, and an emotion image recommendation unit 15.

A recorded data corresponding to a plurality of user's operations is established in a user database 11 previously. The recorded data corresponding to the user's operations stored in the user database 11 comprises a word record, an image used record, and an image used frequency. The word record stores an emotional word obtained by a comparison between an input data and a word classification by the processing unit 14. The image used record in the recorded data stored in the user database 11 stores an image data selected by the user using the emotional word.

Specifically, a first recorded data corresponding to the user's operations stored in the user database 11 comprises the word record "happy", the image used record "happy1.jpg", and the image used frequency "2". A second recorded data corresponding to the user's operations stored in the user database 11 comprises the word record "happy", the image used record "happy2.jpg", and the image used frequency "1". However, these are merely examples, without limiting the present invention.

Thereafter, the image and word database 12 is established previously as storing a plurality of image classifications and a plurality of word classifications therein. Each of the image classifications stores a plurality of image data therein, and each of the word classifications stored a plurality of word data therein, where each of the plurality of image classifications corresponds to one of the plurality of word classifications.

The image classification and the word classification corresponding thereto may be, for example, a "happy" classification, an "anger" classification, a "grief" classification, a "joyous" classification, etc. These are merely examples without limiting the present invention. Specifically, the happy classification stores a first image data "happy1.jpg", a second image data "happy2.jpg", etc. therein. The happy classification stores a first word data "happy", a second word data "glad", etc. therein. The grief classification stores a first image data "grief1.jpg", a second image data "grief2.jpg", etc. therein. In the joyous classification, a first word data "cry", a second word data "sad", etc. are stored. However, these are merely examples without limiting the present invention.

The user provides an input data at an input area on a user interface, and the receiving unit 13 receives the input data inputted by the user at the input area.

Then, the processing unit 14 compares the input data and all the word data to obtain the emotional word included in the input data and the word classification and the image classification corresponding to the emotional word, so as to acquire all the image data included in the image classification.

As continued with the above example, assume the receiving unit 13 receives the input data as "I am very happy today". The processing unit 14 compares the input data "I am very happy today" and all the word data "happy", "glad", "cry", "grief", etc. Then, the emotional word in the input data may be compared to be obtained as "happy". However, this is merely an example, without limiting the present invention. Thereafter, the processing unit 14 compares to obtain the word classification "happy classification" and the image classification "happy classification" corresponding to the emotional word, so as to acquire all the image data stored in the "happy classification". It is to be noted that the emotional word "happy" is a word record in one of the plurality of recorded data stored in the user database.

Thereafter, the processing unit 14 may compare the emotional word and the word record to obtain the image used record and the image used frequency corresponding to the emotional word. The processing unit 14 makes a calculation regarding a correspondence for the emotional word, the image data and the user's operations corresponding to the recorded data.

As the afro-mentioned example, the processing unit 14 has compared to obtain that the image data are "happy1.jpg" and "happy2.jpg", respectively, and the emotional word "happy" and the word record "happy", so as to obtain the image used record as"happy1.jpg" and the image record as "happy2.jpg", and the image used frequency as "2" and "1" corresponding to the emotional word, respectively.

In this manner, the processing unit 14 may calculate the emotional word as "happy" and the image data as "happy1.jpg" and "happy2.jpg" and the correlate values as "2" and "1", respectively.

Thereafter, the emotion image recommendation unit 15 may sort out each of the plurality of image data according to the correlate value. As succeeded from the above example, the image data calculated by the processing unit 14 is "happy1.jpg" having its correlate value of "2", and the image data calculated by the processing unit 15 is "happy2.jpg" having its correlate value of "1". Then, the emotion image recommendation unit 15 may sort out the image data "happy1.jpg" and "happy2.jpg" according to the correlate values "2" and "1", and thus the sorted result is obtained as "happy1.jpg" and "happy2.jpg".

Finally, the emotion image recommendation unit 15 displays the sorted image data sequentially, so as to provide a recommendation of the emotion images. As the mentioned example, after the image data "happy1.jpg" and "happy2.jpg" are such sorted, the emotion image recommendation unit 15 displays the image data "happ1.jpg" and "happy2.jpg" sequentially as a recommendation of the emotion images to the user.

In addition, the receiving unit 13 may further receive an auxiliary data, which may be a unit time correction frequency and a user's facial image. However, these are merely examples without limiting the present invention.

When the receiving unit 13 receives the auxiliary data, the processing unit 14 may determine which image classification is corresponded by the auxiliary data. Specifically, assume the receiving unit 13 now receives the auxiliary data "unit time correction frequency" and the auxiliary data "unit time correction frequency" is determined by the processing unit 14 as larger than a predetermined value, it is indicated that the user is in an anger mood. Hence, the processing unit 14 may determine the image classification corresponded by the auxiliary data as the "anger classification". Assume the receiving unit 13 receives the auxiliary data "user's facial image", the processing unit 14 may determine the auxiliary data "user's facial image" as containing "smile" and the user is now in a happy mood is indicated. Hence, the processing unit 14 may determine the auxiliary data as corresponding to the image classification "happy classification". However, this is merely an example without limiting the present invention.

After the processing unit 14 determines the image classification that the auxiliary data corresponds to, all the image data in the image classification may be acquired, and the correspondence calculation may be launched according to the emotional word, image data, and recorded data corresponding to the user's operations to obtain the correlate value between the emotional word and each of the plurality of image data. Then, the emotion image recommendation unit 15 sorts out each of the plurality of image data according to the calculated correlate values and the sorted image data are sequentially displayed as a recommendation of the emotion images to the user.

Thereafter, the emotion image recommendation system according to a second embodiment of the present invention will be described with reference to FIG. 1, where FIG. 1 is the system block diagram of the emotion image recommendation system according to the present invention.

A user database 11 is established previously, in which a recorded data corresponding to a plurality of user's operations are stored. The recorded data corresponding to the user's operations stored in the user database 11 comprises a word record, an image used record, and an image used frequency. The word record stores an emotional word obtained by a comparison between an input data and a word classification by the processing unit 14. The image used record in the recorded data stored in the user database 11 stores an image data selected by the user using the emotional word.

Specifically, a first recorded data corresponding to the user's operations stored in the user database 11 comprises the word record "happy", the image used record "happy1.jpg", and the image used frequency "2". A second recorded data corresponding to the user's operations stored in the user database 11 comprises the word record "happy", the image used record "happy2.jpg", and the image used frequency "1". However, these are merely examples, without limiting the present invention.

Thereafter, the image and word database 12 is established previously as storing a plurality of image classifications and a plurality of word classifications therein. Each of the image classifications stores a plurality of image data therein, and each of the word classifications stored a plurality of word data therein, where each of the plurality of image classifications corresponds to one of the plurality of word classifications.

The image classification and the word classification corresponding thereto may be, for example, a "happy" classification, an "anger" classification, a "grief" classification, a "joyous" classification, etc. These are merely examples without limiting the present invention. Specifically, the happy classification stores a first image data "happy1.jpg", a second image data "happy2.jpg", etc. therein. The happy classification stores a first word data "happy", a second word data "glad", etc. therein. The grief classification stores a first image data "grief1.jpg", a second image data "grief2.jpg", etc. therein. In the joyous classification, a first word data "cry", a second word data "sad", etc. are stored. However, these are merely examples without limiting the present invention.

The user provides an input data at an input area on a user interface, and the receiving unit 13 receives the input data inputted by the user at the input area.

Then, the processing unit 14 compares the input data and all the word data to obtain the emotional word included in the input data and the word classification and the image classification corresponding to the emotional word, so as to acquire all the image data included in the image classification.

As continued with the above example, assume the receiving unit 13 receives the input data as "I am very happy today". The processing unit 14 compares the input data "I am very happy today" and all the word data "happy", "glad", "cry", "grief", etc. Then, the emotional word in the input data may be compared to be obtained as "happy". However, this is merely an example, without limiting the present invention. Thereafter, the processing unit 14 compares to obtain the word classification "happy classification" and the image classification "happy classification" corresponding to the emotional word, so as to acquire all the image data stored in the "happy classification". It is to be noted that the emotional word "happy" is a word record in one of the plurality of recorded data stored in the user database.

Thereafter, the processing unit 14 may compare the emotional word and the word record to obtain the image used record and the image used frequency corresponding to the emotional word. The processing unit 14 makes a calculation regarding a correspondence for the emotional word, the image data and the user's operations corresponding to the recorded data.

As the afro-mentioned example, the processing unit 14 has compared to obtain that the image data are "happy1.jpg" and "happy2.jpg", respectively, and the emotional word "happy" and the word record "happy", so as to obtain the image used record as"happy1.jpg" and the image record as "happy2.jpg", and the image used frequency as "2" and "1" corresponding to the emotional word, respectively.

In this manner, the processing unit 14 may calculate the emotional word as "happy" and the image data as "happy1.jpg" and "happy2.jpg" and the correlate values as "2" and "1", respectively.

Finally, the emotion image recommendation unit 15 displays the image data having the maximum correlate value, so as to provide a recommendation of the emotion image. As the mentioned example, the emotion image recommendation unit 15 displays the image data "happy1.jpg" having the maximum correlate value as a recommendation of the emotion image to the user.

In addition, the receiving unit 13 may further receive an auxiliary data, which may be a unit time correction frequency and a user's facial image. However, these are merely examples without limiting the present invention.

After the processing unit 14 determines the image classification that the auxiliary data corresponds to, all the image data in the image classification may be acquired, and the correspondence calculation may be launched according to the emotional word, image data, and recorded data corresponding to the user's operations to obtain the correlate value between the emotional word and each of the plurality of image data. Then, the emotion image recommendation unit 15 sorts out each of the plurality of image data according to the calculated correlate values and the sorted image data are sequentially displayed as a recommendation of the emotion images to the user.

Figure 2A:
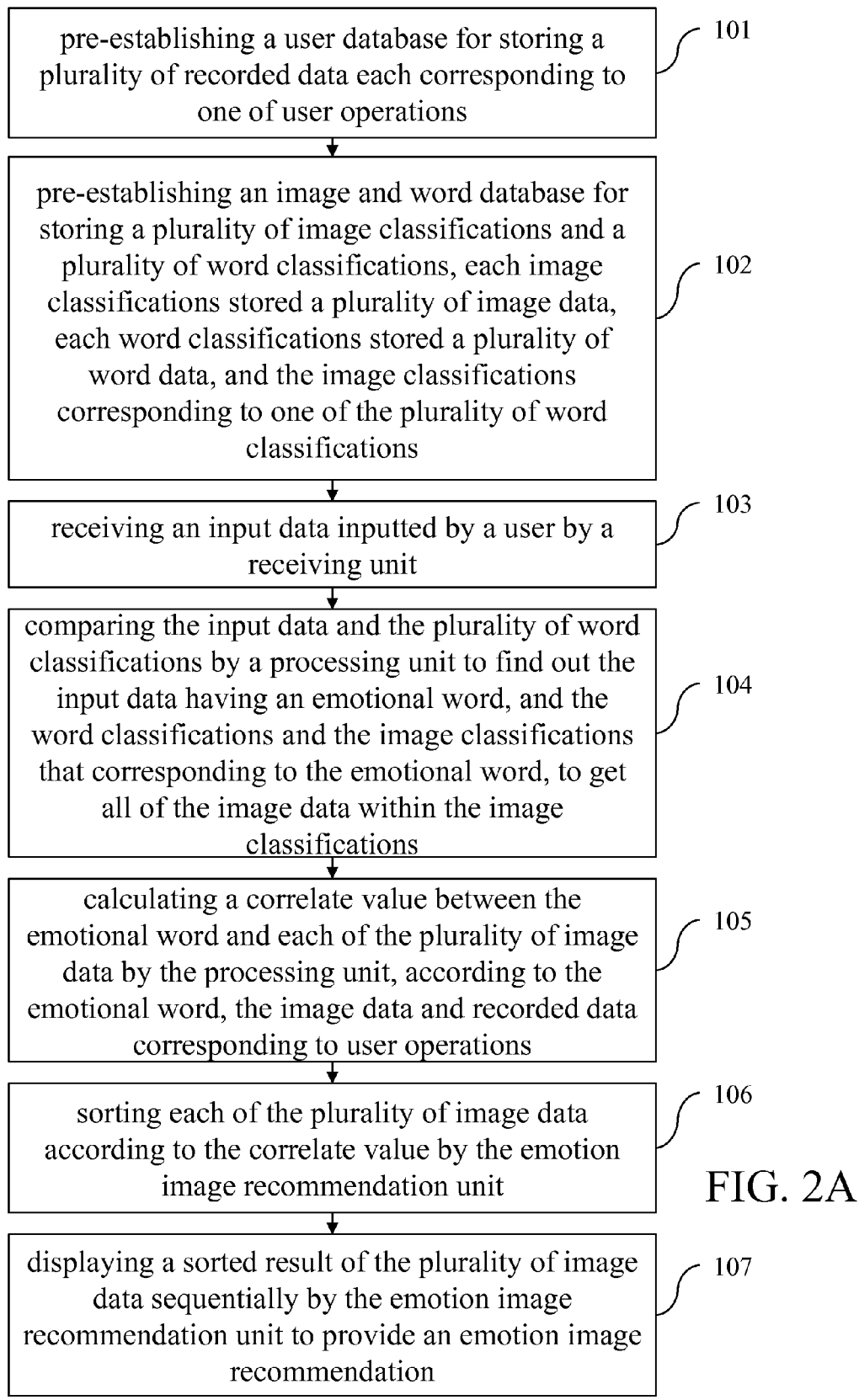
FIG. 2A is a flowchart of an emotion image recommendation method according to a first aspect of the present invention.
Figure 3:
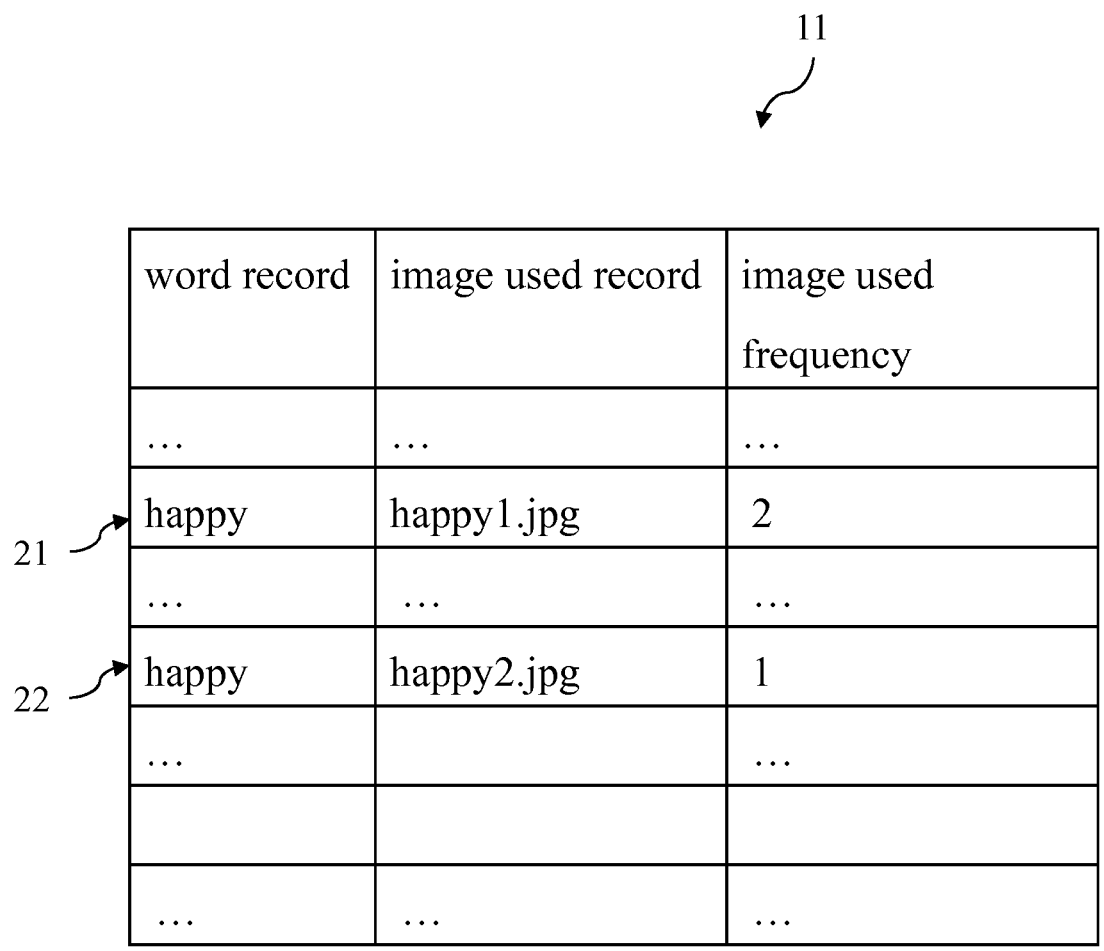
FIG. 3 is a schematic diagram of a user database used in the emotion image recommendation according to the present invention.
Figure 4:
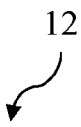
FIG. 4 is a schematic diagram of an image and word database used in the emotion image recommendation according to the present invention.
Figure 5A:
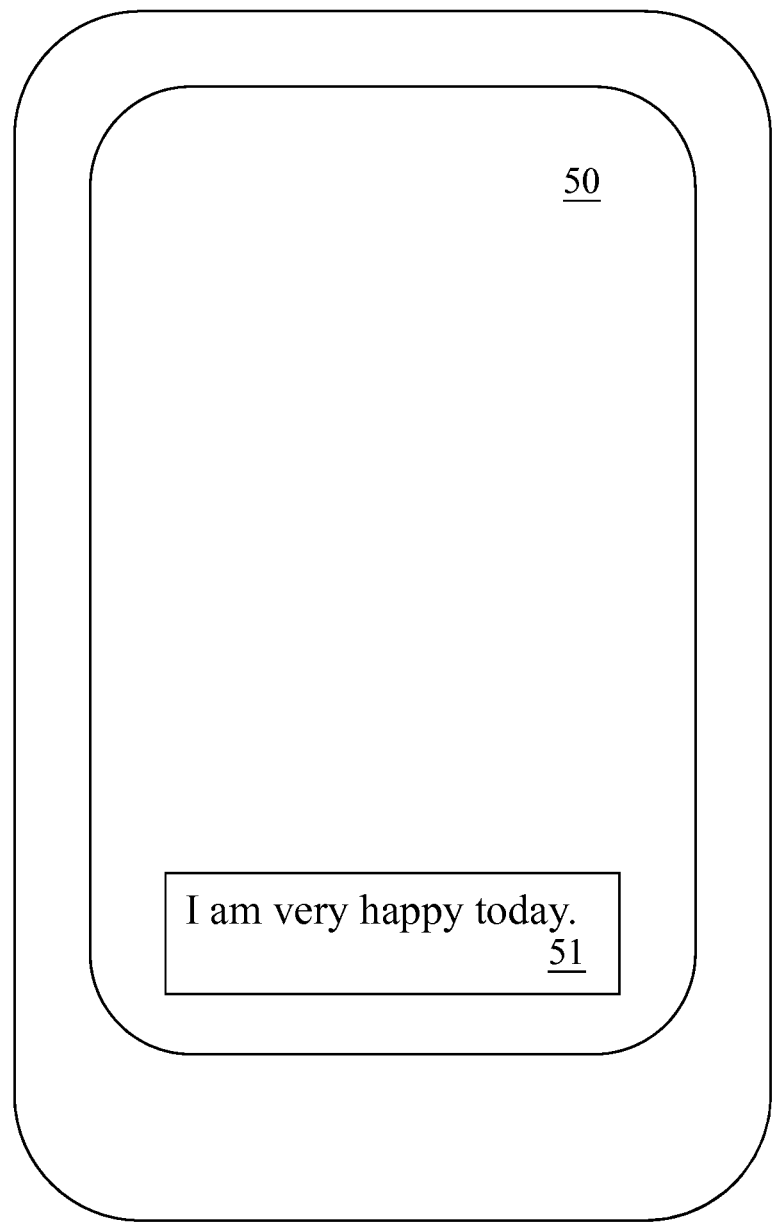
FIG. 5A is a schematic diagram of a user interface used in the emotion image recommendation according to the present invention.
Figure 5B:
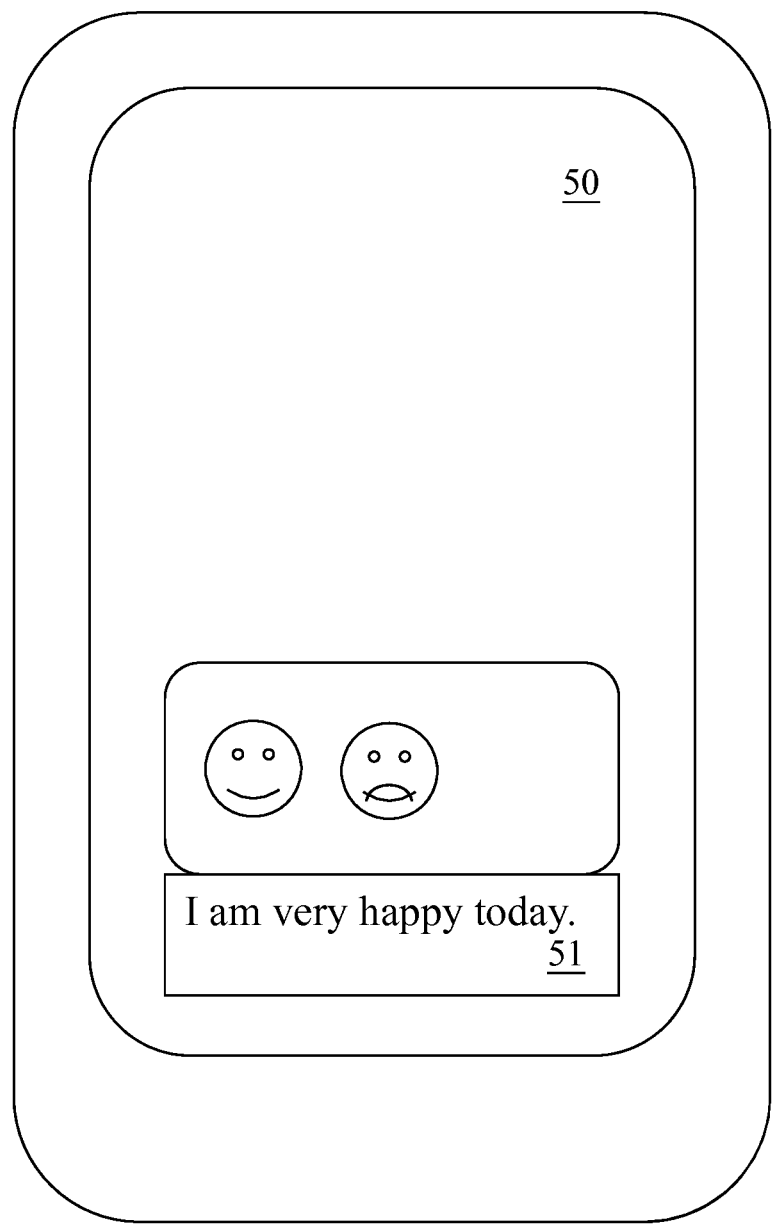
FIG. 5B is a schematic diagram of a recommended result of the emotion image used in the emotion image recommendation according to the present invention.

Thereafter, the first embodiment will be exemplified to explain how the present invention is operated and its process flow, and which is proceeded with simultaneous reference to FIG. 1, FIG. 2A, FIG. 3, FIG. 4, and FIG. 5A and FIG. 5B, where FIG. 1 is a system block diagram of an emotion image recommendation system according to the present invention, FIG. 2A is a flowchart of an emotion image recommendation method according to a first aspect of the present invention, FIG. 3 is a schematic diagram of a user database used in the emotion image recommendation according to the present invention; FIG. 4 is a schematic diagram of an image and word database used in the emotion image recommendation according to the present invention, FIG. 5A is a schematic diagram of a user interface used in the emotion image recommendation according to the present invention, and FIG. 5B is a schematic diagram of a recommended result of the emotion image used in the emotion image recommendation according to the present invention.

As shown in FIG. 3, a recorded data corresponding to a plurality of user's operations is established in the user database 11 previously. The first recorded data corresponding to the user's operations stored in the user database 11 comprises the word record "happy", the image used record "happy1.jpg", and the image used frequency "2". A second recorded data corresponding to the user's operations stored in the user database 11 comprises the word record "happy", the image used record "happy2.jpg", and the image used frequency "1" (S101). The content in the user database 11 is schematically shown in FIG. 3. However, these are merely examples, without limiting the present invention.

As shown in FIG. 4, the image and word database 12 is established previously as storing a plurality of image classifications and a plurality of word classifications therein. Each of the image classifications stores a plurality of image data therein, and each of the word classifications stored a plurality of word data therein, where each of the plurality of image classifications corresponds to one of the plurality of word classifications. The image classifications in the image and word database 12 comprise a "happy" classification 121, an "anger" classification 122, a "grief" classification 123, and a "joyous" classification 124. And, the word classifications in the image and word database 12 comprise a "happy" classification 125, an "anger" classification 126, a "grief" classification 127, and a "joyous" classification 128. Specifically, the happy classification 121 stores a first image data "happy1.jpg" 41, and a second image data "happy2.jpg" 42, and the happy classification 125 stores a first word data 43 "happy" and a second word data 44 "joyful" therein (S102). However, these are merely examples without limiting the present invention.

As shown in FIG. 5A, the user inputs the input data "I am very happy today" at the input area 51 on the user interface 50, then the receiving unit 13 may receive the input data by the user from the input area 51 "I am very happy today" (S103).

The processing unit 14 compares the input data "I am very happy today" and the first and second word data "happy" 43 and "joyful" 44, and obtains the word classification "happy classification"125 and the image classification "happy classification" 121 corresponding to the emotional word. In this manner, the first image data 41 "happy1.jpg" and the second image data 42 "happy2.jpg" are acquired from the "happy classification" 121 (S104).

The processing unit 14 has compared to obtain that the image data are "happy1.jpg" and "happy2.jpg", respectively, and the emotional word "happy" and the word record "happy", so as to obtain the image used record as"happy1.jpg" and the image record as "happy2.jpg", and the image used frequency as "2" and "1" corresponding to the emotional word, respectively (S104).

Thereafter, the processing unit 14 may calculate the emotional word as "happy" and the image data as "happy1.jpg" and "happy2.jpg" and the correspondence as "2" and "1", respectively (S105).

Thereafter, the emotion image recommendation unit 15 may sort out the image data "happy1.jpg" and"happy2.jpg" according to their correlate values "2" and "1", respectively. And the sorted result is obtained as "happy1.jpg" and "happy2.jpg" (S106), and the image data "happy1.jpg" and "happy2.jpg" are sequentially displayed to provide the recommendation of the emotion image (S107), which may be referred to FIG. 5B.

Figure 2B:
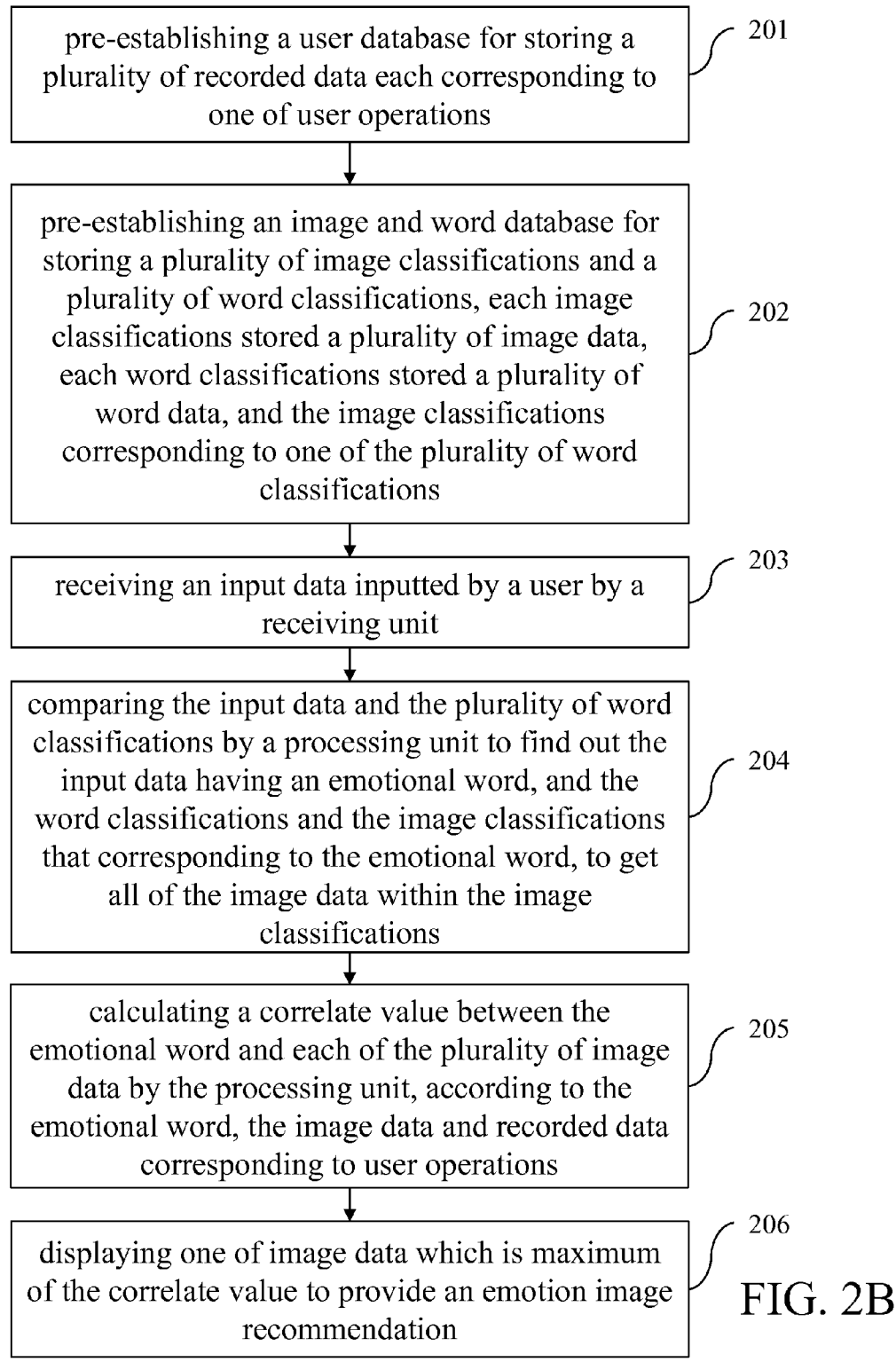
FIG. 2B is a flowchart of an emotion image recommendation method according to a second aspect of the present invention.
Figure 6A:
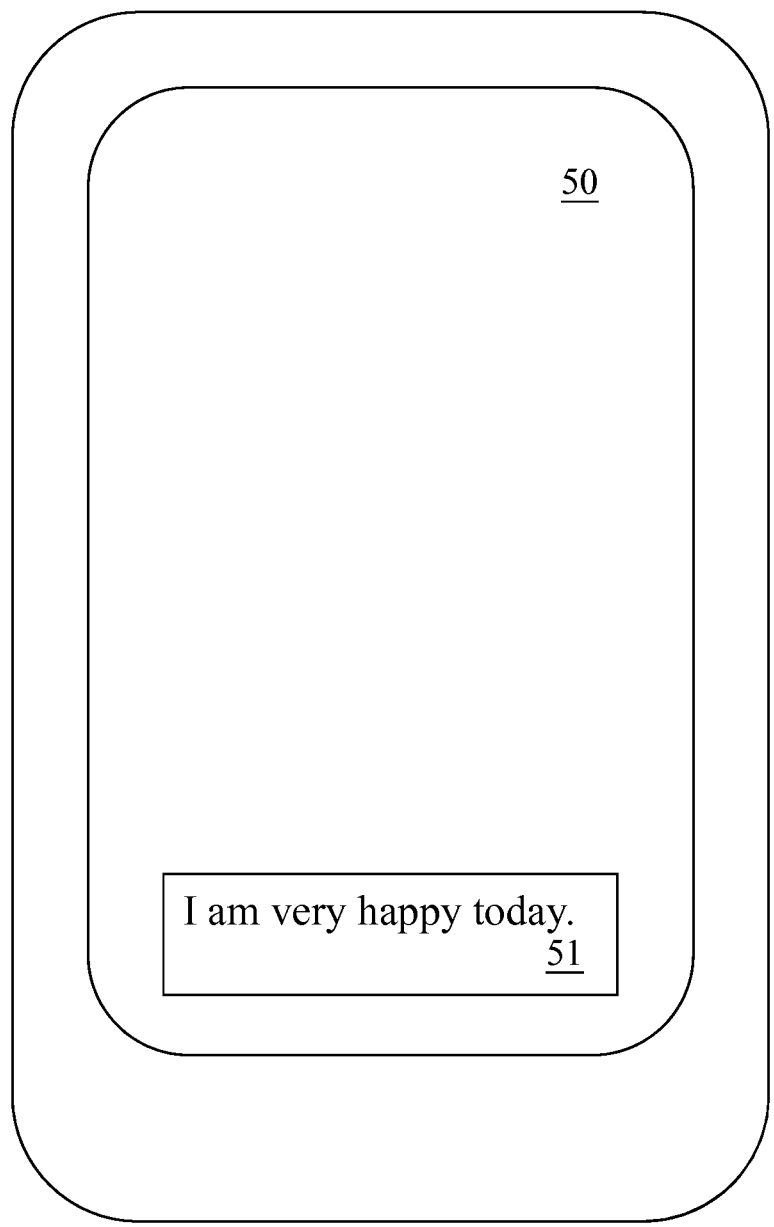
FIG. 6A is a schematic diagram of a user interface used in the emotion image recommendation according to the present invention.
Figure 6B:
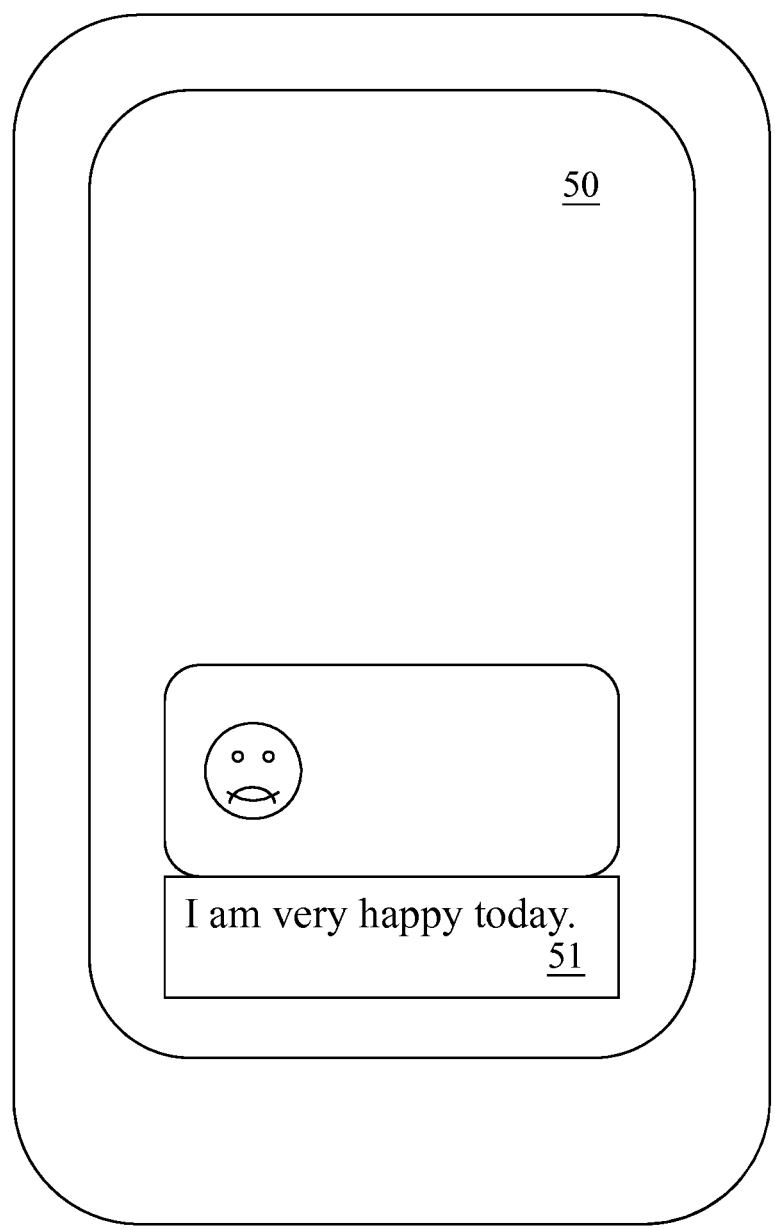
FIG. 6B is a schematic diagram of a recommended result of the emotion image used in the emotion image recommendation according to the present invention.

Thereafter, a second embodiment will be exemplified to explain how the present invention is operated and its process flow, and which is proceeded with simultaneous reference to FIG. 1, FIG. 2B, FIG. 3, FIG. 4, and FIG. 6A and FIG. 6B, where FIG. 1 is a system block diagram of an emotion image recommendation system according to the present invention, FIG. 2B is a flowchart of an emotion image recommendation method according to a second aspect of the present invention, FIG. 3 is a schematic diagram of a user database used in the emotion image recommendation according to the present invention, FIG. 4 is a schematic diagram of an image and word database used in the emotion image recommendation according to the present invention, FIG. 6A is a schematic diagram of a user interface used in the emotion image recommendation according to the present invention, and FIG. 6B is a schematic diagram of a recommended result of the emotion image used in the emotion image recommendation according to the present invention.

As shown in FIG. 3, a recorded data corresponding to a plurality of user's operations is established in the user database 11 previously. A first recorded data corresponding to the user's operations stored in the user database 11 comprises the word record "happy", the image used record "happy1.jpg", and the image used frequency "2". A second recorded data 22 corresponding to the user's operations stored in the user database 11 comprises the word record "happy", the image used record "happy2.jpg", and the image used frequency "1" (S201). The content in the user database 11 is schematically shown in FIG. 3. However, these are merely examples, without limiting the present invention.

As shown in FIG. 4, the image and word database 12 is established previously as storing a plurality of image classifications and a plurality of word classifications therein. Each of the image classifications stores a plurality of image data therein, and each of the word classifications stored a plurality of word data therein, where each of the plurality of image classifications corresponds to one of the plurality of word classifications. The image classifications in the image and word database 12 comprise a "happy" classification 121, an "anger" classification 122, a "grief" classification 123, and a "joyous" classification 124. And, the image classifications in the image and word database 12 comprise a "happy" classification 125, an "anger" classification 126, a "grief" classification 127, and a "joyous" classification 128. Specifically, the happy classification 121 stores a first image data "happy1.jpg" 41, and a second image data "happy2.jpg" 42, and a first word data 43 "happy" and a second word data 44 "joyful" therein (S202). However, these are merely examples without limiting the present invention.

As shown in FIG. 6A, the user inputs the input data "I am very happy today" at the input area 51 on the user interface 50, then the receiving unit 13 may receive the input data by the user from the input area 51 "I am very happy today" (S203).

The processing unit 14 compares the input data "I am very happy today" and the first and second word data "happy" 43 and "joyful" 44, and obtains the word classification "happy classification"125 and the image classification "happy classification" 121 corresponding to the emotional word. In this manner, the first image data 41 "happy1.jpg" and the second image data 42 "happy2.jpg" are acquired from the "happy classification" 121 (S204).

The processing unit 14 has compared to obtain that the image data are "happy1.jpg" and "happy2.jpg", respectively, and the emotional word "happy" and the word record "happy", so as to obtain the image used record as "happy1.jpg" and the image record as "happy2.jpg", and the image used frequency as "2" and "1" corresponding to the emotional word, respectively (S204).

Thereafter, the processing unit 14 may calculate the emotional word "happy" and the image data are "happy1.jpg" and the image record as "happy2.jpg", respectively, and their corresponding correlate values are "2" and "1", respectively (S205).

Thereafter, the emotion image recommendation unit 15 may sort out the image data "happy1.jpg and "happy2.jpg" according to their correlate values "2" and "1", respectively. And the sorted result is obtained as "happy1.jpg" and "happy2.jpg" (S206), and the image data "happy1.jpg" and "happy2.jpg" are sequentially displayed to provide the recommendation of the emotion image (S207), which may be referred to FIG. 6B.

Furthermore, the receiving unit 13 receives the auxiliary data, which may be the unit time correction times and the user's facial image. However, these are merely examples without limiting the present invention.

When the receiving unit 13 receives the auxiliary data, the processing unit 14 may determine which image classification is corresponded by the auxiliary data. Specifically, assume the receiving unit 13 now receives the auxiliary data "unit time correction frequency" and the auxiliary data "unit time correction frequency" is determined by the processing unit 14 as larger than a predetermined value, it is indicated that the user is in an anger mood. Hence, the processing unit 14 may determine the image classification corresponded by the auxiliary data as the "anger classification". Assume the receiving unit 13 receives the auxiliary data "user's facial image", the processing unit 14 may determine the auxiliary data "user's facial image" as containing "smile" and the user is now in a happy mood is indicated. Hence, the processing unit 14 may determine the auxiliary data as corresponding to the image classification "happy classification". However, this is merely an example without limiting the present invention.

After the processing unit 14 determines the image classification that the auxiliary data corresponds to, all the image data in the image classification may be acquired, and the correspondence calculation may be launched according to the emotional word, image data, and recorded data corresponding to the user's operations to obtain the correlate value between the emotional word and each of the plurality of image data. Then, the emotion image recommendation unit 15 sorts out each of the plurality of image data according to the calculated correlate values and the sorted image data are sequentially displayed as a recommendation of the emotion images to the user.

In summary, it may be known that the present invention has the difference as compared to the prior art that the way of recommending the emotion image is used in replace of searching the appropriate emotion image by the user himself/herself may largely save the frequency for searching the appropriate emotion image by the user and further assist in the selection of the appropriate emotion image, thereby providing the accustomed emotion image when the user inputs the emotional word.

By using the above described technical means, the present invention may overcome the problems that locating an appropriate image consumes too much waste frequency and an emotion image may be mis-selected, and thus further achieve in the efficacies that the user may be provided with the emotion image corresponding to the emotional word to largely save the frequency for searching for the appropriate emotion image, and further assisted in the selection of the appropriate emotion image.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A emotion image recommendation system, comprising:
a user database for storing a plurality of recorded data each corresponding to one of user operations;

an image and word database for storing a plurality of image classifications and a plurality of word classifications, each image classification stored a plurality of image data, each word classification stored a plurality of word data, and the image classifications corresponding to one of the plurality of word classifications;

a receiving unit for receiving an input data inputted by a user and an auxiliary data, wherein the auxiliary data comprising a unit frequency correction frequency and a user's facial image;

a processing unit for comparing the input data and the plurality of word classifications to find out the input data having an emotional word, determining the one of the plurality of image classifications corresponding to the auxiliary data to acquire all the plurality of image data therein, and calculating a correlate value between the emotional word and each of the plurality of image data in the one of the plurality of image classifications corresponding to the auxiliary data, according to the emotional word, the image data and recorded data corresponding to user operations; and an emotion image recommendation unit for sorting each of the plurality of image data according to the correlate value, and displaying a sorted result of the plurality of image data sequentially, to provide an emotion image recommendation.

2. The emotion image recommendation system as claimed in claim 1, wherein the recorded data stored in the user database comprises a word record, an image used record, and an image used frequency, and the processing unit is used to compare the emotional word and the word record to obtain the image used record and the image used frequency corresponding to the emotional word.

3. The emotion image recommendation system as claimed in claim 1, wherein the word record in the recorded data stored in the user database is the emotional word compared from the input data and the word classification by the processing unit, and the image used record in the recorded data stored in the user database is the image data selected by the user corresponding to the emotional word.

4. A emotion image recommendation method, comprising steps of:
pre-establishing a user database for storing a plurality of recorded data each corresponding to one of user operations;
pre-establishing an image and word database for storing a plurality of image classifications and a plurality of word classifications, each image classifications stored a plurality of image data, each word classifications stored a plurality of word data, and the image classifications corresponding to one of the plurality of word classifications;
receiving an input data inputted by a user and an auxiliary data by a receiving unit, wherein the auxiliary data comprising a unit frequency correction frequency and a user's facial image;
comparing the input data and the plurality of word classifications by a processing unit to find out the input data having an emotional word, and the word classifications;
determining the one of the plurality of image classifications corresponding to the auxiliary data to acquire all the plurality of image data therein;
calculating a correlate value between the emotional word and each of the plurality of image data in the one of the plurality of image classifications corresponding to the auxiliary data by the processing unit, according to the emotional word, the image data and recorded data corresponding to user operations;
sorting each of the plurality of image data according to the correlate value by the emotion image recommendation unit; and
displaying a sorted result of the plurality of image data sequentially by the emotion image recommendation unit to provide an emotion image recommendation.

5. The emotion image recommendation method as claimed in claim 4, further comprising steps of:
comparing the emotional word and a word record to obtain an image used record and an image used frequency corresponding to the emotional word, wherein the recorded data stored in the user database comprises the word record, the image used record, and the image used frequency.

6. The emotion image recommendation method as claimed in claim 4, further comprising steps of:
comparing the word record in the recorded data stored in the user database and the emotional word compared from the input data and the plurality of word data of the word classification by the processing unit; and
storing the image used record in the recorded data stored in the user database is the image data selected by the user corresponding to the emotional word.

7. A emotion image recommendation system, comprising:
a user database for storing a plurality of recorded data each corresponding to one of user operations;
an image and word database for storing a plurality of image classifications and a plurality of word classifications, each image classifications stored a plurality of image data, each word classifications stored a plurality of word data, and the image classifications corresponding to one of the plurality of word classifications;
a receiving unit for receiving an input data inputted by a user and an auxiliary data, wherein the auxiliary data comprising a unit frequency correction frequency and a user's facial image;
a processing unit for comparing the input data and the plurality of word classifications to find out the input data having an emotional word, and the word classifications, determining the one of the plurality of image classifications corresponding to the auxiliary data to acquire all the plurality of image data therein, and calculating a correlate value between the emotional word and each of the plurality of image data in the one of the plurality of image classifications corresponding to the auxiliary data, according to the emotional word, image data and the recorded data corresponding to user operations; and
an emotion image recommendation unit for displaying one of image data which is maximum of the correlate value to provide an emotion image recommendation.

8. The emotion image recommendation system as claimed in claim 7, wherein the recorded data stored in the user database comprises a word record, an image used record, and an image used frequency, and the processing unit is used to compare the emotional word and the word record to obtain the image used record and the image used frequency corresponding to the emotional word, and the word record in the recorded data stored in the user database is the emotional word compared from the input data and the plurality of word data of the word classification by the processing unit, and the image used record in the recorded data stored in the user database is the image data selected by the user corresponding to the emotional word.

* * * * *